United States Patent Office 3,203,864
Patented Aug. 31, 1965

3,203,864
ADRENOCORTICOTROPHIC PREPARATION AND METHOD OF MAKING SAME
Henry H. Freedman, Princeton, N.J., assignor to Princeton Laboratories, Inc., Princeton, N.J., a corporation of New Jersey
No Drawing. Filed Sept. 1, 1961, Ser. No. 135,430
19 Claims. (Cl. 167—74)

This application is a continuation-in-part of my copending application Serial No. 478,177, now abandoned.

This invention is that of a derivative of adrenocorticotrophin (hereinafter called ACTH) obtained by heating ACTH and a polyhydroxy agent such as a monosaccharidic aldehydic substance, under conditions that are not detrimental to the ACTH, the aldehydic substance, and the resulting ACTH derivative.

The resulting ACTH derivative is useful by parenteral administration and manifests significantly enhanced ACTH activity over that ordinarily available from the amount of ACTH needed to yield the quantity of this derivative administered. The invention includes also the method of making this ACTH derivative.

More specifically the invention is that of a derivative of ACTH showing such enhanced ACTH activity, and which is obtained by so heating ACTH with either a monosaccharide aldose having from four to seven carbon atoms in its chain or with a uronic acid hexose. The method of the invention involves heating the ACTH and the monosaccharidic substance in a liquid medium which at least partially dissolves them but which dissolves the particular ACTH derivative, and at a temperature under that which is detrimental to the materials being heated and the derivative to be produced.

Since the sole source of ACTH is pituitary glands, and practically only from the hog, its availability is restricted by the available supply of the gland. Thus, increasing call for ACTH for use in its presently known applications and additional need for it as its fields of utility may expand can create a serious difficulty if the pituitary gland supply cannot keep pace with the demand for ACTH.

Accordingly, the ACTH derivative of this invention, along with its method of preparation, serve to reduce the problem inherent in the restricted pituitary gland supply.

An important feature of the invention is its provision of an ACTH derivative which manifests a significantly enhanced ACTH activity over that of the actual quantity of ACTH used. A further significant feature is that this ACTH derivative is just as safely and conveniently used as is ACTH itself. Yet a further effective feature is that the derivative of the invention is so readily prepared by the method of the invention and by a minimum number of easily conducted relatively low cost steps.

Considered broadly, the ACTH derivative of the invention is the product of, and the method of the invention involves, heating together, at elevated temperature in an inert liquid medium, the ACTH and a glucide member of the class of (i) a monosaccharide aldose with a chain of from four to seven carbon atoms and (ii) a uronic acid hexose. The elevated temperature should be high enough to produce the derivative in reasonably practical time, but below that which is detrimental to the ACTH or the glucide reactant or the ACTH derivative. The inert liquid medium should have some solvent action on the reactants and be a solvent for the quantity of ACTH derivative produced and at the elevated temperature used.

Any adrenocorticotrophin from any source can be used as the ACTH reactant. Use of a purified ACTH, e.g. by the method of Astwood et al., "Purification of Cortoco-Trophin With Oxycellulose," Journal of the American Chemical Society, volume 73 (1951), is preferred. Other ACTH starting materials used to advantage herein include the less purified ACTH obtained, for example, by (a) the glacial acetic acid extraction without oxycellulose purification, and (b) the acid-acetone isolation method. However, the corresponding derivative of the invention of all known ACTH materials, regardless of their source or preparation method, show an enhanced potency as compared with what the same quantity of them respectively show in the unreacted form.

The hydroxy, or polyhydroxy, aldehydic substance to be reacted with the ACTH, to prepare the products of this invention by the method of the invention, is a glucide-like substance which can be a monosaccharide aldose having a chain of from four to seven carbon atoms or a uronic acid hexose. A "glucide" is defined, for example, in Albert P. Mathews' "Principles of Biochemistry," William Wood & Company, Baltimore, Md., 1937, page 11.

The monosaccharide aldose subgroup of the hydroxy, or polyhydroxy, aldehydic reactants includes not only the normal aldoses having the formula $C_x(H_2O)_x$ but also the desoxy aldoses, i.e. wherein one of the end carbons of the carbon chain is in methyl group. Thus, the applicable monosaccharide aldose reactants include the normal aldoses, for example, an aldoheptose such as mannoheptose; any of the aldohexoses such as the normal hexoses as glucose, mannose, galactose, idose, gulose, and altrose, as well as the desoxy hexoses as rhamnose and fucose; any of the aldopentoses such as xylose, ribose, arabinose, and lyxose; and also any of tetroses such as therose and erythrose.

The applicable desoxy aldoses are not limited to the mono-desoxy aldoses rhamnose and fucose, for also applicable are the various poly-desoxy aldoses even up to a tetra-desoxy aldose, for example, tetra-desoxy hexose, i.e. $CH_3(CH_2)_3CHOH \cdot CHO$. The latter exemplifies the mono-hydroxy aldehydic type of glucide-like reactant applicable for making the ACTH derivatives of the invention. Thus, the various applicable desoxy aldoses can have the general formula

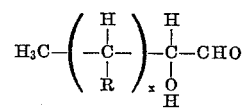

wherein R is separately hydrogen or the hydroxyl group in any individual group

and X is a small number from one to four.

The desoxy aldoses wherein a hydroxyl group is linked to the carbon atom adjacent to the aldehyde or aldehydic group are particularly applicable. The foregoing general formula for the applicable desoxy aldoses is intended to include any of them whether its structural formula is written with an open chain and a terminal methyl group as just above shown or in the so-called pyranose (or cyclic inner ether) form found, for example, in The Merck Index, seventh edition (1960), for rhamnose (p. 903) and for fucose (p. 464) etc.

Since The Merck Index and some other works show the so-called pyranose form structural formula for the normal, as well as the desoxy, aldoses, the term "aldehydic" is used herein and in the appended claims in its broad sense as simply relating to that particular portion of these specific aldoses regardless of what form of the structural formula of any of them is considered, i.e. either its open chain form having a terminal regular aldehyde group or its pyranose form, e.g. as for glucose

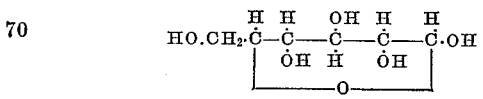

The uronic acid hexose type of glucide-like substance to be reacted with ACTH to form the ACTH derivative of the invention is exemplified by glucuronic acid and ascorbic acid (otherwise designated as 3-threoketohexuronic acid), and metal ascorbates, e.g., alkali metal ascorbates, such as sodium ascorbate and ammonium ascorbate.

The foregoing uronic acids and the above-described desoxy aldoses likewise exemplify the applicable derived aldoses or derived monosaccharidic aldoses.

Within the broad scope of the method of the invention as recited in the seventh paragraph hereof, individual operating conditions for preparing any specific ACTH derivative and relative proportions of the reactants can be varied appreciably. Such variation depends primarily on the properties of the particular glucide-like reactant selected and to a lesser extent on the liquid medium, selected to be used for the reaction.

The glucide-like starting material can vary from about one-tenth to about ten times the weight of ACTH; or otherwise stated as from about 100 milligrams to about 10 grams of glucide-like starting material per gram of ACTH. Generally about equal weights of each of the two types of reactants are preferred, with some advantage indicated by using at least some excess of the glucide-like material.

With under 100 milligrams of the glucide-like material per gram of ACTH, the reaction time is prolonged undesirably; whereas with over 10 grams of it per gram of ACTH, the excess of the glucide-like material, if it is to be separated, introduces undesirable additional steps for removing the excess from the desired ACTH derivative end product.

Ordinarily, there need be no concern about using any reasonably large excess of the glucide-like material. That is so for generally any not unreasonable proportion of unreacted glucide-like material left admixed with the final product is not harmful because of the general lack of toxicity of those substances. In any event, whenever deemed desirable, any of such excess unreacted glucide-like material left admixed with the ACTH derivative at the end of its preparation can be separated as later noted.

The ACTH starting material conveniently can be dissolved in the liquid medium selected for carrying out the reaction. For example, such medium can be one in which the reactants have at least some significant solubility, and in which the ACTH derivative is soluble. For example, the derivative is quite readily soluble in methanol and also in water.

The concentration of ACTH to use in the selected reaction liquid can vary based on the type of starting ACTH material and practical manufacturing requirements. For example, one gram of ACTH per 300 milliliters of methanol as reaction solvent or medium may be preferred. For example, the ACTH can be dissolved, or even dispersed with some in suspension, in the methanol, the glucide-like material then added, and the reaction mixture refluxed.

The refluxing should be continued until a short sufficient time after all of the reactants appear to go completely into solution. With methanol, a refluxing time of six hours appears to be preferred, although the reaction may be seen to be completed earlier. The refluxing may be continued longer without detriment.

With water as the reaction liquid, it is preferred to use a concentration of about 8 grams of ACTH per 100 milliliters of final solution. In using water, the ACTH preferably is dissolved, with even some amount in suspension, in a near-neutral aqueous buffer solution, to the extent of from about 4 to 12 grams of ACTH per 100 milliliters of final solution. An advantageous buffer solution is 0.5 molar phosphate solution showing a pH of 7.6.

With water as the reaction medium, the glucide-like material can be used effectively in a concentration of from about 10 to about 60 grams of it per 100 milliliters of final solution, although about 30 grams of it are preferred for that final volume.

The reaction, using water as the medium, advantageously is carried out by heating with stirring at from about 50 to about 60° C. for about 30 minutes. Lower temperatures, if used, would prolong the reaction time unnecessarily. Higher temperatures give no advantage.

How much longer to continue the reaction after the reactants appear to have become completely stably dispersed or dissolved, can be determined by comparing the ACTH activity of the derivative of a sample taken from the reaction with that of the original material. When no significant difference is noted between the enhanced activity of two successive samples of the ACTH derivative from the reaction compared with that of the initial ACTH starting material, it is practical to consider the reaction completed.

After completing the reaction, most of the reaction liquid medium or solvent is removed under vacuum at a temperature below that at which activity of the derivative is reduced. Then the ACTH derivative is precipitated from the thus concentrated solution of it by admixture of a common organic solvent, for example, acetone, ether, and chloroform, in which the derivative is insoluble.

As already stated, low proportions of residual glucide-like material can be left in the final ACTH derivative without adverse effect on its enhanced potency (over the initial ACTH) and suitability for injection. However, any excess of the glucide-like material can be removed, for example, by differential solubility, i.e. by using a solvent for the glucide-like material, in which the ACTH derivative is insoluble. The worker of ordinary skill in the art readily can make suitable selection for the particular end ACTH derivative, from the known solvents and non-solvents for the glucide-like starting material and simple test on the end product.

As the ACTH derivative is soluble in water, it can be put up in any suitable aqueous medium for use by any parenteral route. As a separate feature of the invention, the finished ACTH derivative can be admixed with a compatible retarding agent and thereby manifest the benefit not only of its own enhanced potency but also of prolonged release of the available enhanced therapeutic effect. There can be used as the retarding agent any compatible examples of the well known substances which reduce a drug's absorption rate into or from the blood stream, either by virtue of the viscosity or of the astringent nature of such substance.

Carboxymethylcellulose, gelatin, and polyvinyl pyrrolidone exemplify those retarding agents whose viscosity accounts for their retarding release of a drug (e.g. the ACTH derivative hereof) from the injection site. Aluminum hydroxide illustrates the applicable retarding agents whose astringent action reduces absorption rate form the injection site. Aluminum dihydroxide monostearate apparently is applicable by reducing such absorption by virtue of both astringency and absorption rate.

The invention is illustrated by, but not restricted to, the following examples:

*Example I.*—One gram of ACTH (oxycellulose purified) was dispersed into 300 milliliters of methanol, and one gram of anhydrous glucose was added. The mixture was refluxed for 6 hours. The methanol then was removed under vacuum. One hundred milliliters of acetone were added to the residue which was swished about in it and the acetone-immersed dried ACTH derivative was powdered with a stirring rod. The thus disintegrated solid particles of the derivative were collected by centrifugation. Another one hundred milliliters of acetone were added to and admixed with the finely divided solid derivative which again was collected by centrifugation. A third one hundred milliliters of acetone then were added and admixed, after which the methanol-freed ACTH derivative was collected on a Büchner funnel, by using vacuum. The finally dried ACTH derivative was prepared in dosages for therapeutic use by the usual methods of processing parenterals.

*Example II.*—The procedure of Example I was followed except that in place of the one gram of glucose, an equal amount of xylose was used.

*Example III.*—The procedure of Example I was followed except that one gram of ascorbic acid was substituted for the one gram of glucose.

The procedure of Example III can be considered as repeated in all of its steps respectively separately, except by replacing the ascorbic acid by an equal amount, respectively separately, of (a) sodium ascorbate, (b) of ammonium ascorbate, (c) of glucuronic acid, (d) of ammonium glucuronate, (e) of sodium glucuronate, or of any other pharmaceutically acceptable alkali metal glucuronate.

*Example IV.*—One gram of ACTH (oxycellulose purified) was suspended in 2.5 milliliters of 0.5 molar phosphate buffer of pH 7.6 Ten milliliters of a solution of glucose in water, containing 37.5 grams of glucose per 100 milliliters of solution, were added to the suspension of ACTH in buffer. The resulting mixture was stirred thoroughly and kept at 55° C. for 30 minutes, with stirring. The solvent (water) then was removed under vacuum. The ACTH derivative residue then was dried with acetone in the manner described in Example I.

The procedure of Example IV can be considered as repeated in all of its steps respectively separately, except for replacing the glucose by an equal amount respectively separately (a) of ascorbic acid, (b) of sodium ascorbate, (c) of glucuronic acid, (d) of sodium glucuronate, and (e) of ammonium glucuronate; and likewise (f) of any other one of the various normal and desoxy aldoses specifically referred to and named hereinabove, or any mixtures of any of them.

*Example V.*—The various procedures included by all of the disclosures given as to each of Examples I through IV were repeated in separate preparations. The ACTH derivative obtained from each of them was individually dissolved in a respectively separate volume of a solution containing 25 grams of polyvinyl pyrrolidone in 100 milliliters of solution. Each of these mixtures was stirred thoroughly. After sterilization, each of these several ACTH derivatives and retarding agent preparations (containing the PVP) was ready for use by injection.

The procedure of Example V can be considered as repeated in all of its steps respectively separately, except for replacing the polyvinyl pyrrolidone by an equivalent amount to yield about the same viscosity of end preparation respectively separately (a) of carboxymethylcellulose, (b) of gelatin, and (c) of aluminum dihydroxide monostearate; and (d) an equal amount of aluminum hydroxide.

The enhanced activity of the ACTH derivative of the invention is noted by the observation that immediately upon injection, the ACTH derivative produces a sudden response which is substantially in excess of that produced by a dose of the amount of unreacted adrenocorticotrophin needed for the dose used by the ACTH derivative. Similarly, the pattern of response to an injected dose of the ACTH derivative is that, at any patricular point of time, it always is stronger, as if a much greater dosage of the original ACTH had been given.

While the invention has been explained by giving detailed description of certain specific embodiments of it, it is understood that various modifications and substitutions can be made in any of the embodiments, within the scope of the appended claims which are intended also to cover equivalents of the various embodiments.

What is claimed is:

1. The method of potentiating the available adrenocorticotrophic activity of an adrenocorticotrophin, which comprises heating directly together a reaction mixture wherein the reactants consist essentially of (a) the adrenocorticotrophin and (b) a glucide member of the class consisting of (i) a monosaccharide aldose having a chain of from four to seven carbon atoms and (ii) a uronic acid hexose at an elevated temperature sufficient to produce the amount of the adrenocorticotrophic derivative available under the reaction conditions from the respective quantities of the reactants (a) and (b) and below that which is detrimental to any of the reactants (a) and (b) and the adrenocorticotrophin derivative produced as their reaction product, said heating being performed in an inert liquid medium having some solvent action on the reactants (a) and (b) and being a solvent for said reaction product under the reaction conditions; said heating continuing for a time sufficient to produce the amount of said adrenocorticotrophin derivative available under the reaction conditions from the respective quantities of the reactants (a) and (b) used; and separating the resulting adrenocorticotrophin derivative so produced; said derivative manifesting significantly enhanced adrenocorticotrophin activity over that available from the same quantity of original adrenocorticotrophin used to produce the derivative.

2. The method of potentiating the available adrenocorticotrophic activity of an adrenocorticotrophin, which comprises heating (a) the adrenocorticotrophin directly together with (b) a glucide member of the class consisting of (i) a monosaccharide aldose having a chain of from four to seven carbon atoms and (ii) a uronic acid hexose, in a sufficient quantity of methanol and at an elevated temperature to enable it to reflux and sufficient to produce the amount of the adrenocorticotrophic derivative available under the reaction conditions from the respective quantities of the reactants (a) and (b) and below that which is detrimental to any of the reactants (a) and (b) and the adrenocorticotrophic derivative produced as their reaction product, and for a time sufficient to produce the amount of said adrenocorticotrophin derivative available under the reaction conditions from the respective quantities of the reactants (a) and (b) used; and separating the methanol from the resulting adrenocorticotrophin derivative so produced; said derivative manifesting significantly enhanced adrenocorticotrophin activity over that available from the same quantity of original adrenocorticotrophin used to produce the derivative.

3. The method of potentiating the available adrenocorticotrophic activity of an adrenocorticotrophin, which comprises heating (a) the adrenocorticotrophin directly together with (b) a glucide member of the class consisting of (i) a monosaccharide aldose having a chain of from four to seven carbon atoms and (ii) a uronic acid hexose, in water at from about 50° to about 60° C. and under alkaline conditions up to about pH 7.6; and for a time sufficient to produce the amount of said adrenocorticotrophin derivative available under the reaction conditions from the respective quantities of these reactants (a) and (b) used; and separating the resulting adrenocorticotrophin derivative so produced; said derivative manifesting significantly enhanced adrenocorticotrophin activity over that available from the same quantity of original adrenocorticotrophin used to produce the derivative.

4. The method of potentiating the available adrenocorticotrophic activity of an adrenocorticotrophin, which comprises heating (a) the adrenocorticotrophin directly together with (b) a glucide member of the class consisting of (i) a monosaccharide aldose having a chain of from four to seven carbon atoms and (ii) a uronic acid hexose, in water at from about 50° to about 60° C. and under alkaline conditions up to about pH 7.6; and for a time sufficient to produce the amount of said adrenocorticotrophin derivative available under the reaction conditions from the respective quantities of the reactants (a) and (b) used; and separating the water from the resulting adrenocorticotrophin derivative so produced; said derivative manifesting significantly enhanced adrenocorticotrophin activity over that available from the same quantity of original adrenocorticotrophin used to produce the derivative.

5. The method of claim 1, wherein the glucide member is a monosaccharide aldose.

6. The method of claim 1, wherein the glucide member is a monosaccharide aldohexose.

7. The method of claim 6, wherein the aldohexose is glucose.

8. The method of claim 6 wherein the aldohexose in mannose.

9. The method of claim 1, wherein the glucide member is an aldopentose.

10. The method of claim 9 wherein the aldopentose is xylose.

11. The method of claim 1, wherein the uronic acid hexose is glucuronic acid.

12. The method of claim 1, wherein the uronic acid hexose is ascorbic acid.

13. The method of claim 1, wherein the uronic acid hexose is a pharmaceutically acceptable metal ascorbate.

14. The method of claim 13 wherein the metal ascorbate is an alkali metal ascorbate.

15. The method of claim 14 wherein the alkali metal ascorbate is sodium ascorbate.

16. The method of claim 1, wherein the uronic acid hexose is ammonium ascorbate.

17. The product produced by the process of claim 1.

18. The product of claim 17 having included therewith a pharmaceutically acceptable agent for retarding the rate of absorption of said adrenocorticotrophic derivative from the site of its injection and which retarding agent is compatible with said derivative.

19. The product of claim 18 wherein the retarding agent is a member of the class consisting of gelatin, polyvinyl pyrrolidone, carboxymethylcellulose, and aluminum hydroxide.

References Cited by the Examiner
UNITED STATES PATENTS
2,669,537   2/54   Thompson _____ 167—74

OTHER REFERENCES

Constantinides: Chem. Abst., vol. 45, 1951, page 6305b.
Therien: Chem. Abst., vol. 46, 1952, pages 11383i and 11384a.

JULIAN S. LEVITT, *Primary Examiner.*

MORRIS O. WOLK, LEWIS GOTTS, *Examiners.*